(12) United States Patent
Hirosawa

(10) Patent No.: US 11,407,040 B2
(45) Date of Patent: Aug. 9, 2022

(54) DRILL

(71) Applicant: OSG CORPORATION, Toyokawa (JP)

(72) Inventor: Katashi Hirosawa, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 0 days.

(21) Appl. No.: 16/957,121

(22) PCT Filed: May 21, 2018

(86) PCT No.: PCT/JP2018/019438
§ 371 (c)(1),
(2) Date: Jun. 23, 2020

(87) PCT Pub. No.: WO2019/224862
PCT Pub. Date: Nov. 28, 2019

(65) Prior Publication Data
US 2020/0346290 A1    Nov. 5, 2020

(51) Int. Cl.
*B23B 51/02* (2006.01)
*B23B 51/06* (2006.01)

(52) U.S. Cl.
CPC .............. *B23B 51/02* (2013.01); *B23B 51/06* (2013.01); *B23B 2251/122* (2013.01);
(Continued)

(58) Field of Classification Search
CPC .......... B23B 2251/08; B23B 2251/082; B23B 2251/12; B23B 2251/122;
(Continued)

(56) References Cited

U.S. PATENT DOCUMENTS 5,628,837 A * 5/1997 Britzke ................... B23B 51/02
 134/39
9,511,424 B2 * 12/2016 Takai ...................... B23B 51/02
(Continued)

FOREIGN PATENT DOCUMENTS

DE   102005003496 A1 *  7/2006 ............. B23B 51/02
DE   112015002883 T5     3/2017
(Continued)

OTHER PUBLICATIONS

Machine Translation, JP2004141970A. (Year: 2004).*
(Continued)

*Primary Examiner* — Chwen-Wei Su
(74) *Attorney, Agent, or Firm* — Muncy, Geissler, Olds & Lowe, P.C.

(57) ABSTRACT

A drill includes a leading end portion. The leading end portion is flat and has at least two cutting blades extending from a rotation center toward outside in a radial direction. The each cutting blade includes an arc-shaped portion. An inside linear portion is formed in a linear shape and connects to one end of the arc-shaped portion on the rotation center side. An outside linear portion is formed in a linear shape and connects to another end of the arc-shaped portion on an opposite side to the one end. The arc-shaped portion has a cutting edge provided with an arc-shaped portion chamfered surface. The inside linear portion and the outside linear portion each has a cutting edge provided with a linear portion chamfered surface. A drill axis direction width of the arc-shaped portion chamfered surface is smaller than a drill axis direction width of the linear portion chamfered surface.

6 Claims, 22 Drawing Sheets

(52) U.S. Cl.
CPC ....... *B23B 2251/14* (2013.01); *B23B 2251/18* (2013.01); *B23B 2251/241* (2013.01); *B23B 2251/40* (2013.01)

(58) Field of Classification Search
CPC .......... B23B 2251/125; B23B 2251/14; B23B 2251/18; B23B 2251/241; B23B 2251/40; B23B 51/06; B23B 51/02; Y10T 408/905; Y10T 408/906; Y10T 408/9097; Y10T 408/909
See application file for complete search history.

(56) References Cited

U.S. PATENT DOCUMENTS

| | | | | |
|---|---|---|---|---|
| 2007/0134071 A1* | 6/2007 | Reinhardt | ............... | B23B 51/02 408/230 |
| 2017/0232529 A1* | 8/2017 | Kawakami | .............. | B23B 51/00 408/230 |
| 2017/0274460 A1* | 9/2017 | Jindai | ..................... | C23C 14/06 |
| 2018/0243841 A1* | 8/2018 | Nakanohara | ............ | B23B 51/02 |

FOREIGN PATENT DOCUMENTS

| | | |
|---|---|---|
| JP | 2004-141970 A | 5/2004 |
| JP | 2009-018360 A | 1/2009 |
| JP | 2014-193513 A | 10/2014 |
| JP | 2016-002617 A | 1/2016 |
| WO | WO-2015194408 A1 * 12/2015 | ............. B23B 51/02 |
| WO | 2017043129 A1 | 3/2017 |

OTHER PUBLICATIONS

Machine Translation, WO 2015/194408. (Year: 2015).*
English translation of International Search Report of PCT/JP2018/019438 dated Jul. 31, 2018.
Notification of Reasons for Rejection issued for the corresponding JP patent application No. 2018-554419 dated Sep. 17, 2019 and English translation thereof.
International Preliminary Report on Patentability, which includes Written Opinion of the International Searching Authority, of the International Application PCT/JP2018/019438 dated Nov. 24, 2020.
Notification of Reason for Refusal for the corresponding KR patent application No. 10-2020-7019128 dated Aug. 20, 2021 and English translation thereof.
The extended European Search Report for the corresponding EP application No. EP18919515.9 dated Jan. 12, 2022.

* cited by examiner

FIG. 6

<ARC-SHAPED PORTION RATIO=60%>

| L2 (mm) | L1 (mm) | | | | |
|---:|:---:|:---:|:---:|:---:|:---:|
| | 0.0000 | 0.0036 | 0.0219 | 0.0420 | 0.0600 |
| 0.000 | △ | ○ | ○ | ○ | × |
| 0.005 | △ | ○ | ○ | ○ | × |
| 0.008 | △ | ○ | ○ | ○ | × |
| 0.010 | △ | × | × | × | × |

FIG. 7

<ARC-SHAPED PORTION RATIO=50%>

| L2 (mm) | L1 (mm) | | | | |
|---:|:---:|:---:|:---:|:---:|:---:|
| | 0 | 0.0072 | 0.0438 | 0.0840 | 0.1200 |
| 0 | △ | ○ | ○ | ○ | × |
| 0.005 | △ | ○ | ○ | ○ | × |
| 0.008 | △ | ○ | ○ | ○ | × |
| 0.010 | △ | × | × | × | × |

FIG. 8

<ARC-SHAPED PORTION RATIO=70%>

| L2 (mm) | L1 (mm) | | | | |
|---:|:---:|:---:|:---:|:---:|:---:|
| | 0 | 0.0120 | 0.0730 | 0.1400 | 0.2000 |
| 0 | △ | ○ | ○ | ○ | × |
| 0.005 | △ | ○ | ○ | ○ | × |
| 0.008 | △ | ○ | ○ | ○ | × |
| 0.010 | △ | × | × | × | × |

FIG. 9

<ARC-SHAPED PORTION RATIO=73%>

| L2 (mm) | L1 (mm) | | | | |
|---|---|---|---|---|---|
| | 0 | 0.0192 | 0.1168 | 0.2240 | 0.3200 |
| 0 | △ | × | × | × | × |
| 0.005 | △ | × | × | × | × |
| 0.008 | △ | × | × | × | × |
| 0.010 | △ | × | × | × | × |

FIG. 10

<ARC-SHAPED PORTION RATIO=45%>

| L2 (mm) | L1 (mm) | | | | |
|---:|:---:|:---:|:---:|:---:|:---:|
| | 0 | 0.0240 | 0.1460 | 0.2800 | 0.4000 |
| 0 | △ | × | × | × | × |
| 0.005 | △ | × | × | × | × |
| 0.008 | △ | × | × | × | × |
| 0.010 | △ | × | × | × | × |

FIG. 11

<ARC-SHAPED PORTION RATIO=60%>

| L1 (mm) | 0 | 0.0036 | | 0.0219 | | | 0.0420 | | |
|---|---|---|---|---|---|---|---|---|---|
| L2 (mm) | 0 | 0.0050 | 0.0080 | 0.0000 | 0.0050 | 0.0080 | 0.0000 | 0.0050 | 0.0080 |
| POINT ANGLE (°) 150 | × | × | × | × | × | × | × | × | × |
| 160 | ○ | ○ | ○ | ○ | ○ | ○ | ○ | ○ | ○ |
| 180 | ○ | ○ | ○ | ○ | ○ | ○ | ○ | ○ | ○ |

FIG. 12

<ARC-SHAPED PORTION RATIO=50%>

| L1 (mm) | | 0.0072 | | | 0.0438 | | | 0.0840 | | |
|---|---|---|---|---|---|---|---|---|---|---|
| L2 (mm) | | 0 | 0.0050 | 0.0080 | 0.0000 | 0.0050 | 0.0080 | 0.0000 | 0.0050 | 0.0080 |
| POINT ANGLE (°) | 150 | × | × | × | × | × | × | × | × | × |
| | 160 | O | O | O | O | O | O | O | O | O |
| | 180 | O | O | O | O | O | O | O | O | O |

FIG. 13

<ARC-SHAPED PORTION RATIO=70%>

| L1 (mm) | | 0 | 0.0120 | | 0.0730 | | | 0.1400 | | |
|---|---|---|---|---|---|---|---|---|---|---|
| L2 (mm) | | 0 | 0.0050 | 0.0080 | 0.0000 | 0.0080 | 0.0050 | 0.0000 | 0.0050 | 0.0080 |
| POINT ANGLE (°) | 150 | × | × | × | × | × | × | × | × | × |
| | 160 | ○ | ○ | ○ | ○ | ○ | ○ | ○ | ○ | ○ |
| | 180 | ○ | ○ | ○ | ○ | ○ | ○ | ○ | ○ | ○ |

FIG. 14

<ARC-SHAPED PORTION RATIO=73%>

| L1 (mm) | | 0.0192 | | 0.1168 | | 0.2240 | |
|---|---|---|---|---|---|---|---|
| L2 (mm) | | 0 | 0.0050 | 0.0080 | 0 | 0.0050 | 0.0080 | 0 | 0.0050 | 0.0080 |
| POINT ANGLE (°) | 150 | × | × | × | × | × | × | × | × | × |
| | 160 | × | × | × | × | × | × | × | × | × |
| | 180 | × | × | × | × | × | × | × | × | × |

FIG. 15

<ARC-SHAPED PORTION RATIO=45%>

| L1 (mm) | | 0.0240 | | 0.1460 | | 0.2800 | |
|---|---|---|---|---|---|---|---|
| L2 (mm) | 0 | 0.0050 | 0.0080 | 0 | 0.0050 | 0.0080 | 0 | 0.0050 | 0.0080 |
| POINT ANGLE (°) | 150 | × | × | × | × | × | × | × | × | × |
| | 160 | × | × | × | × | × | × | × | × | × |
| | 180 | × | × | × | × | × | × | × | × | × |

FIG. 16

<HOLE DIAMETER>

|  |  | T1 | | T2 | |
| --- | --- | --- | --- | --- | --- |
|  |  | a (mm) | b (mm) | a (mm) | b (mm) |
| HOLE NO. | 1 | 16.015 | 15.998 | 15.993 | 15.992 |
|  | 2 | 15.981 | 15.990 | 15.991 | 15.996 |
|  | 3 | 16.009 | 15.972 | 15.996 | 15.995 |

FIG. 17

<HOLE OVERSIZE>

|  |  | T1 | | | T2 | | |
|---|---|---|---|---|---|---|---|
|  |  | a (mm) | b (mm) | AVERAGE | a (mm) | b (mm) | AVERAGE |
| DRILL DIAMETER | | 15.979 | 15.979 | | 15.992 | 15.992 | |
| HOLE NO. | 1 | 0.036 | 0.019 | 0.028 | 0.001 | 0.000 | 0.000 |
| | 2 | 0.002 | 0.011 | 0.007 | −0.001 | 0.004 | 0.001 |
| | 3 | 0.030 | −0.007 | 0.012 | 0.004 | 0.003 | 0.003 |

FIG. 18

⟨HOLE POSITION DISPLACEMENT AMOUNT⟩

| HOLE NO. | DIRECTION | T1 | T2 |
|---|---|---|---|
| 1 | X | -0.029 | -0.023 |
| | Y | 0.129 | 0.122 |
| | HOLE POSITION DISPLACEMENT AMOUNT | 0.132 | 0.124 |
| 2 | X | -0.027 | -0.032 |
| | Y | 0.134 | 0.119 |
| | HOLE POSITION DISPLACEMENT AMOUNT | 0.137 | 0.123 |
| 3 | X | -0.027 | -0.009 |
| | Y | 0.124 | 0.117 |
| | HOLE POSITION DISPLACEMENT AMOUNT | 0.127 | 0.117 |

DRILL

TECHNICAL FIELD

The present invention relates to a drill.

BACKGROUND ART

A drill is proposed in which a point angle is set to 170° to 180° and a component force in a radial direction received when biting into a work material is reduced (refer to Patent Literature 1, for example). A cutting blade of the drill is configured by a substantially linear portion, and a recessed R portion whose ratio to the whole cutting blade is 15 to 60%. A linear chamfer is provided at an outer peripheral corner portion with which the cutting blade and a margin are in contact.

CITATION LIST

Patent Literature

Patent Literature 1: Japanese Laid-Open Patent Publication No. 2004-141970

SUMMARY OF INVENTION

The drill described in Patent literature 1 is a drill whose leading end portion is flat. Therefore, in comparison to a normal drill, a biting performance into the work material is inferior. Thus, there is a problem that enlargement of a hole diameter easily occurs and hole drilling with high precision is difficult. Although the outer peripheral corner portion is provided with the chamfer, the substantially linear portion and the recessed R portion are not provided with a chamfer. Thus, there is also a problem that the cutting edge is easily chipped in the substantially linear portion and the recessed R portion. In order to solve this problem, for example, it is conceivable to provide a chamfer also on the substantially linear portion and the recessed R portion, in the same manner as the outer peripheral corner portion. However, blunting occurs more than necessary in a section, such as the recessed R portion, on which a cutting load is less likely to be applied than the outer peripheral corner portion and the substantially linear portion. This may result in an increase in the cutting load.

It is an object of the present invention to provide a drill that can reinforce a cutting edge of a cutting blade and can improve a biting performance with respect to a work material.

An aspect of the present invention is a drill whose leading end portion is flat and has at least two cutting blades extending from a rotation center toward outside in a radial direction. Each of the cutting blades includes an arc-shaped portion formed in an arc shape, an inside linear portion formed in a linear shape and connecting to one end of the arc-shaped portion on the rotation center side, and an outside linear portion formed in a linear shape and connecting to another end of the arc-shaped portion on an opposite side to the one end. The arc-shaped portion has a cutting edge provided with an arc-shaped chamfered surface that is chamfered, and the inside linear portion and the outside linear portion each have a cutting edge provided with a linear portion chamfered surface that is chamfered. A drill axis direction width of the arc-shaped portion chamfered surface is smaller than a drill axis direction width of the linear portion chamfered surface.

According to the present aspect, since the drill axis direction width of the arc-shaped portion chamfered surface is made smaller than the drill axis direction width of the linear portion chamfered surface, it is possible to reinforce the cutting edge while retaining sharpness at the cutting edge of the arc-shaped portion. Thus, the drill can enhance the biting performance with respect to the work material while inhibiting chipping of the cutting blade. As a result of enhancing the biting performance, it is possible to reduce vibration occurring in the drill at the time of drilling. Since the vibration can be reduced, it is possible to inhibit positional displacement of a machined hole and to prompt formation of fine chips.

The drill axis direction width of the linear portion chamfered surface of the present aspect may be within a range of 0.12 to 1.4 percent of a drill diameter, and the drill axis direction width of the arc-shaped portion chamfered surface may be equal to or less than 0.008 mm. Thus, the drill of the present aspect can further enhance the biting performance with respect to the work material.

A length of the arc-shaped portion of the present aspect in the radial direction may be within a range of 50 to 70 percent of a length of the whole cutting blade in the radial direction. Thus, the drill of the present aspect can further enhance the biting performance with respect to the work material.

The present aspect may include a drill main body portion having the leading end portion; a chip discharge groove formed in a spiral shape along an axis line direction of the drill main body portion, in an outer peripheral surface of the drill main body portion, from the cutting blade to a rear end side of the drill main body portion; a supply path to which a cutting oil is supplied and which extends inside the drill main body portion from the rear end side toward the leading end portion; and an oil hole provided in the leading end portion and communicated with the supply path, the oil hole being configured to eject the cutting oil that has flowed through the supply path. Due to the cutting oil ejected from the oil hole, the drill of the present aspect can lower the temperature of a machining point at which the drill comes into contact with the work material. As a result, it is possible to cut the work material to a deeper depth. Further, since the cutting oil is ejected from the oil hole, the drill can cause the fine chips to easily flow along the chip discharge groove.

In the present aspect, the leading end portion being flat may mean that a point angle of the leading end portion is within a range of 160 degrees to 180 degrees. Since the drill of the present aspect is a flat drill whose point angle is 160 degrees to 180 degrees, it can be used for a wide variety of applications, such as spotfacing in an inclined surface or a curved surface, half-hole drilling and the like.

BRIEF DESCRIPTION OF DRAWINGS

FIG. 6 is a chart showing results of test section 1-1 (arc-shaped portion ratio=60%).

FIG. 7 is a chart showing results of test section 1-2 (arc-shaped portion ratio=50%).

FIG. 8 is a chart showing results of test section 1-3 (arc-shaped portion ratio=70%).

FIG. 9 is a chart showing results of test section 1-4 (arc-shaped portion ratio=73%).

FIG. 10 is a chart showing results of test section 1-5 (arc-shaped portion ratio=45%).

FIG. 11 is a chart showing results of test section 2-1 (arc-shaped portion ratio=60%).

FIG. 12 is a chart showing results of test section 2-2 (arc-shaped portion ratio=50%).

FIG. 13 is a chart showing results of test section 2-3 (arc-shaped portion ratio=70%).

FIG. 14 is a chart showing results of test section 2-4 (arc-shaped portion ratio=73%).

FIG. 15 is a chart showing results of test section 2-5 (arc-shaped portion ratio=45%).

FIG. 16 is a chart showing results of a hole diameter in test 3.

FIG. 17 is a chart showing results of a hole oversize in test 3.

FIG. 18 is a chart showing results of a hole position displacement amount in test 4.

DESCRIPTION OF EMBODIMENTS

Figure 1:
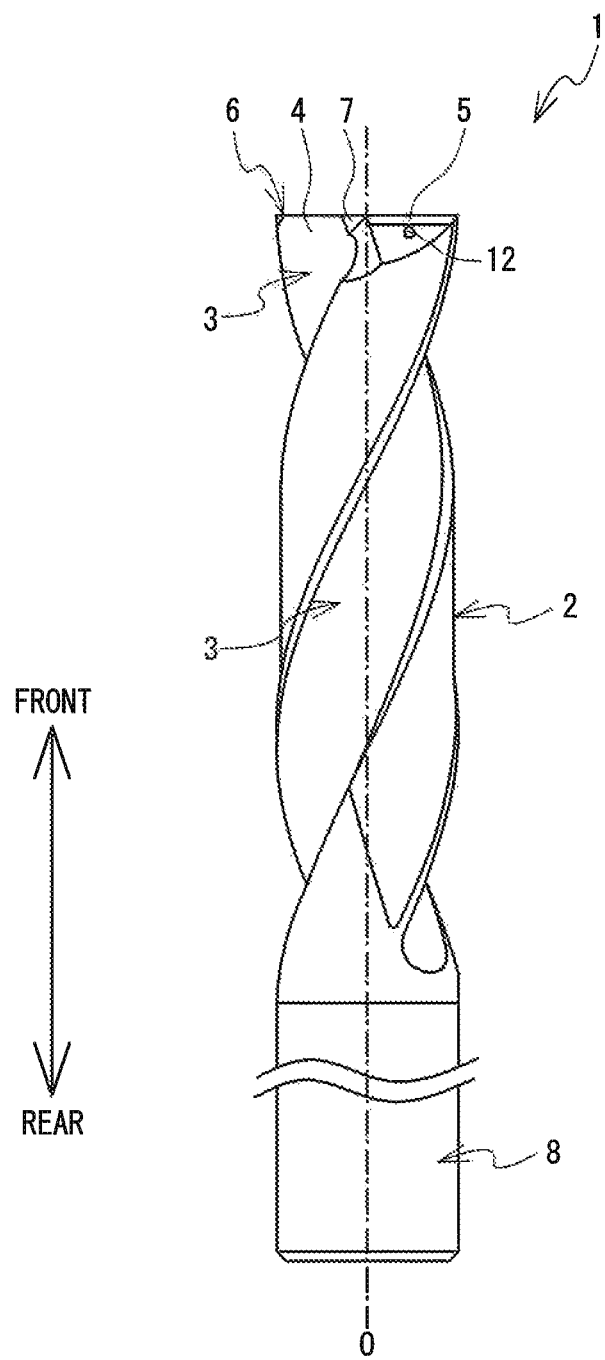
FIG. 1 is a side view of a drill 1 (having two blades).
Figure 2:
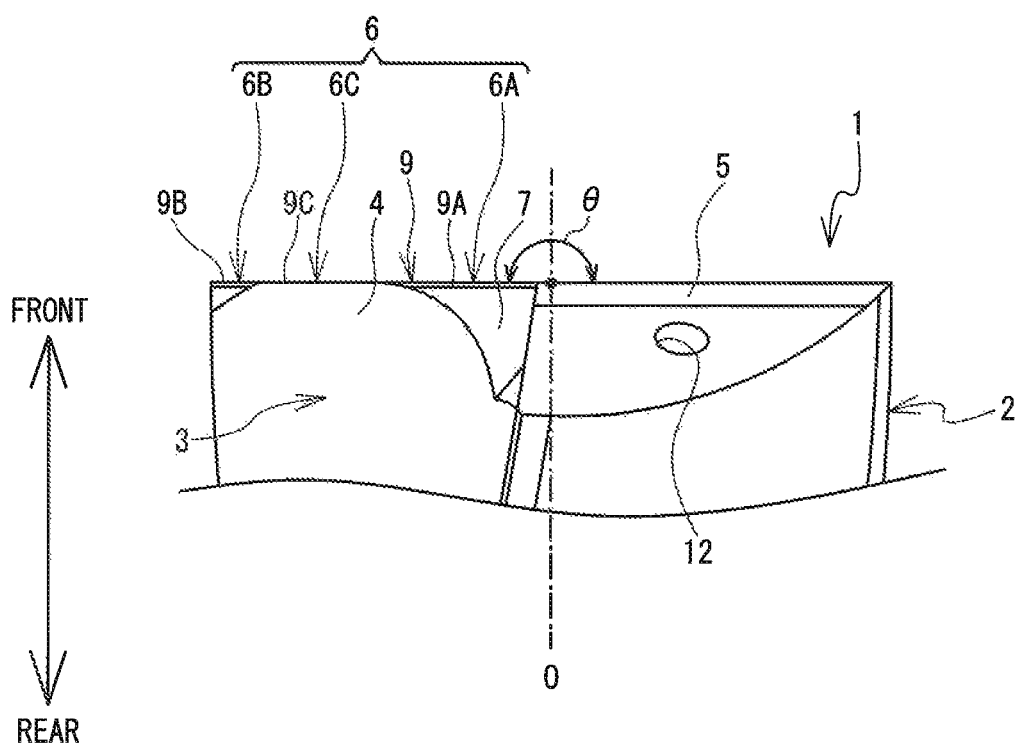
FIG. 2 is a partially enlarged view of a leading end side of the drill 1 shown in FIG. 1.

Hereinafter, an embodiment of the present invention will be explained. The shape of a drill 1 described below is not intended to limit the present invention thereto insofar as there is no specific description, and is merely an explanatory example. The drawings are used to explain technological features that can be adopted by the present invention. In the explanation below, front and rear directions shown by arrows in the drawings are used.

The configuration of the drill 1 will be explained with reference to FIG. 1 to FIG. 5. The drill 1 is a flat drill whose leading end portion is flat. Therefore, the drill 1 can be applied to a wide variety of drilling applications. The wide variety of drilling applications are, for example, spotfacing, curved surface spotfacing, spotfacing in a complicated position, hole counterboring, guide hole drilling for a long drill, inclined exit surface machining, curved exit surface machining, cross hole drilling, through hole drilling in a curved surface, through hole drilling of a thin plate, correction of an eccentric hole, half-hole drilling, drilling of overlapping holes, blind tapped hole drilling, and the like. Since the leading end portion is flat, at the time of biting during inclined surface machining, for example, a component force in a radial direction applied to the drill 1 is reduced. Therefore, the drill 1 can suppress slipping of the leading end portion and a resulting deterioration in hole position precision at the time of biting. The drill 1 has two blades, and may be formed by a hard material, such as a cemented carbide, a high-speed tool steel (high speed steel) or the like.

Figure 3:
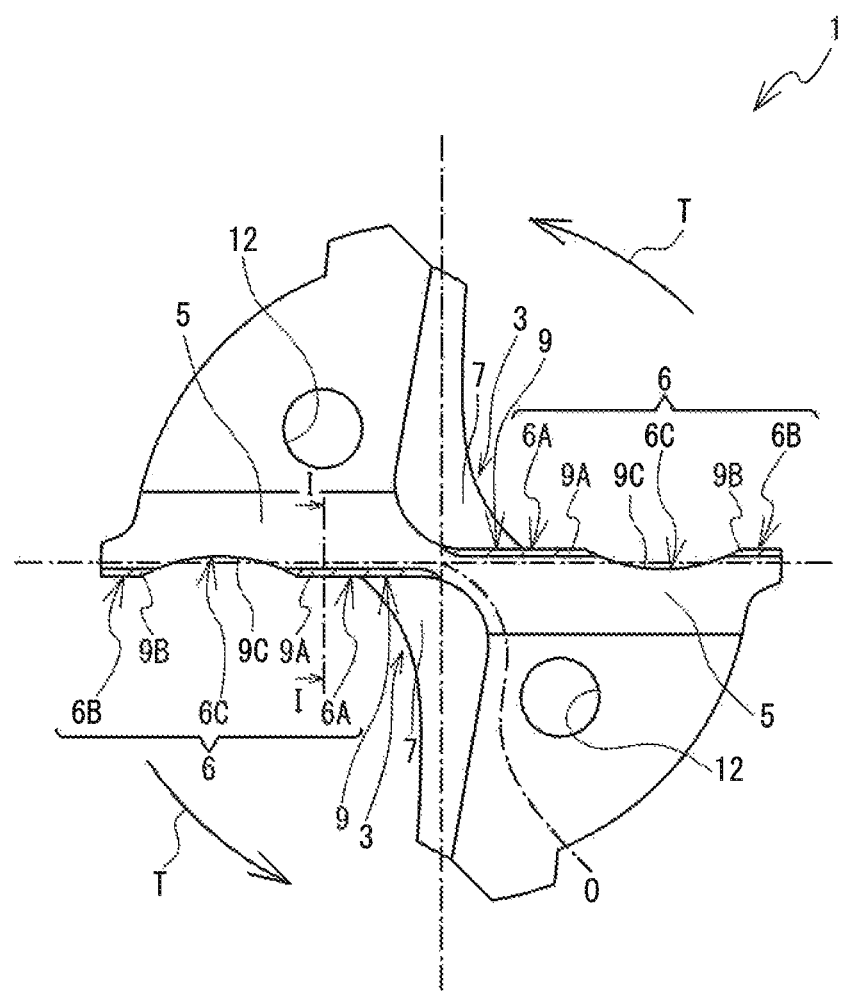
FIG. 3 is a front view of the drill 1.

The drill 1 is provided with a main body portion 2 and a shank portion 8. The shank portion 8 is formed in a columnar bar shape. The rear end portion of the shank portion 8 is attached to a main shaft or the like of a machine tool not shown in the drawings, and is driven to rotate. The main body portion 2 is coaxially fixed to the leading end portion of the shank portion 8, and extends forward along an axis line of the shank portion 8. The front end portion of the main body portion 2 is the leading end portion, and is the leading end portion of the drill 1. As shown in FIG. 3, at the leading end portion of the main body portion 2, two cutting blades 6 are formed in a substantially linear shape in a front view, with an axis line O therebetween. Two discharge grooves 3 to discharge chips are formed in a spiral shape in an outer peripheral surface of the main body portion 2. A groove surface at the leading end of the discharge groove 3 is a rake face 4 (refer to FIG. 2). The single cutting blade 6 is formed by a ridge line at a position where the rake face 4 and a flank 5 at the leading end intersect each other, and a ridge line at a position where the flank 5 and a groove surface of a thinning portion 7 formed at the center of the leading end of the main body portion 2 intersect each other.

Two supply paths (not shown in the drawings), to which a cutting fluid is supplied from the outside, are provided inside the main body portion 2 and the shank portion 8. The two supply paths extend in a spiral shape along the axis line O, from the rear end side of the shank portion 8 toward the leading end portion of the main body portion 2. Circular oil holes 12 are respectively provided in the two flanks 5 formed at the leading end portion of the main body portion 2. The two oil holes 12 are communicated with the two supply paths.

By rotating around the axis line O, the drill 1 cuts a work material using the cutting blades 6 and forms a hole or the like while discharging chips using the discharge grooves 3. A rotation direction T of the drill 1 at the time of machining is a counter-clockwise direction in a front view (refer to FIG. 3). The machine tool having the main shaft to which the drill 1 is attached rotates the main shaft clockwise and cuts the work material. During the rotation of the main shaft, the cutting fluid supplied from the outside flows through the supply paths of the drill 1, and is ejected from the oil holes 12 at the leading end portion of the main body portion 2. The cutting fluid cools a machining point at the leading end portion of the drill 1, flows through the discharge grooves 3 together with the chips, and is discharged.

Figure 4:
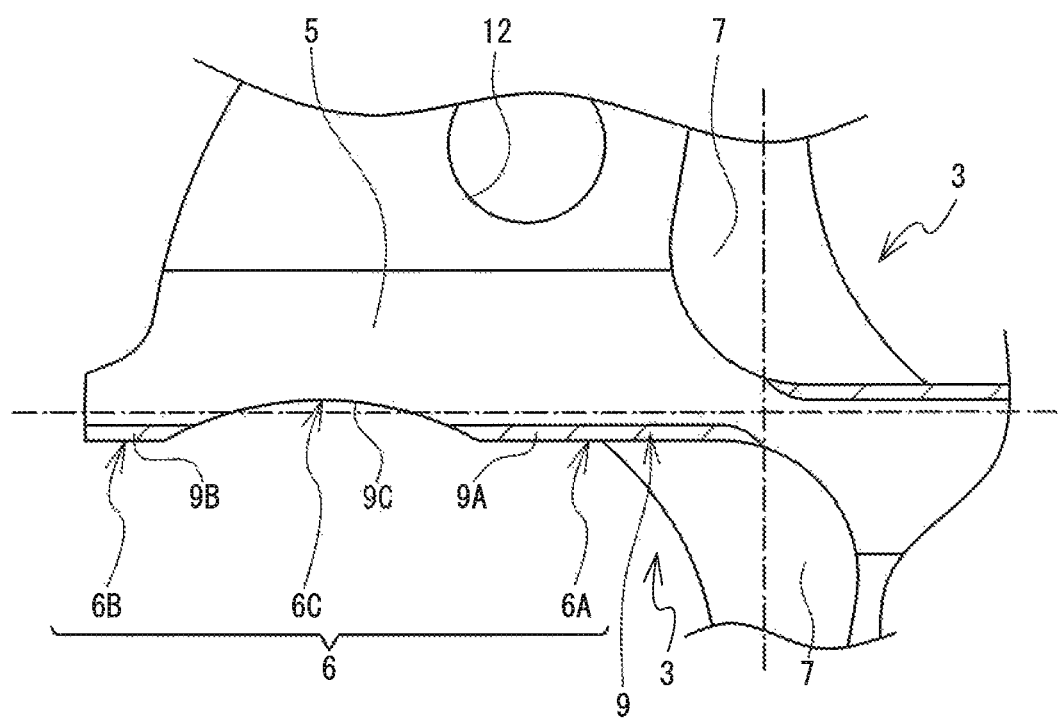
FIG. 4 is a partially enlarged view around a cutting blade 6 of the drill 1 shown in FIG. 3.
Figure 5:
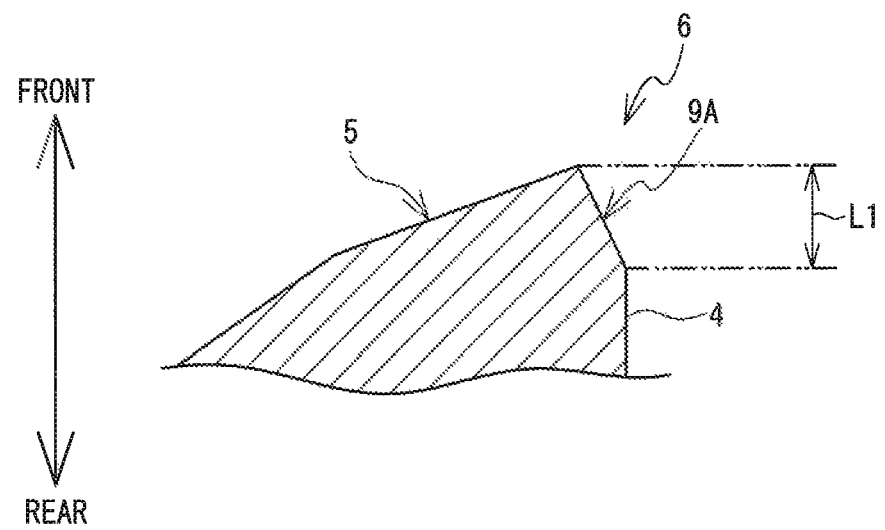
FIG. 5 is a cross-sectional view taken in the direction of arrows along a line I-I shown in FIG. 3.

The configuration of the cutting blades 6 will be explained. Note that respective shapes of the two cutting blades 6 are point symmetric with each other, with the axis line O therebetween. Therefore, the configuration of the single cutting blade 6 will be explained here. As shown in FIG. 3 and FIG. 4, the cutting blade 6 is provided with a thinning portion cutting blade 6A, an outer peripheral portion cutting blade 6B and an arc-shaped portion cutting blade 6C. The thinning portion cutting blade 6A is formed in a linear shape on a section along the thinning portion 7, and extends along the radial direction. The outer peripheral portion cutting blade 6B is formed in a linear shape on a section on an outer end side of the cutting blade 6, and extends along the radial direction. The arc-shaped portion cutting blade 6C is formed between the thinning portion cutting blade 6A and the outer peripheral portion cutting blade 6B, and is formed to be recessed in an arc shape toward an opposite side to the rotation direction T. The ratio of the arc-shaped portion cutting blades 6C to the whole area of the cutting blades 6 is preferably set within a range of 50 to 70%.

The cutting blade 6 is further provided with a chamfered surface 9. The chamfered surface 9 is a surface formed by chamfering the cutting edge of the cutting blade 6. Since the drill 1 of the present embodiment is a cemented carbide, it has a characteristic that the cutting edge is easily chipped by the leading end portion coming into contact with the work material. By chamfering and reinforcing the cutting edge of the cutting blade 6, the chamfered surface 9 inhibits chipping occurring in the cutting blade 6. The chamfered surface 9 is provided with a thinning portion chamfered surface 9A, an outer peripheral portion chamfered surface 9B and an arc-shaped portion chamfered surface 9C. The thinning portion chamfered surface 9A is provided on a section, on the rake face 4 side, of the cutting edge of the thinning portion cutting blade 6A (refer to FIG. 5). The outer peripheral portion chamfered surface 9B is provided on a section, on the rake face 4 side, of the cutting edge of the outer peripheral portion cutting blade 6B. The arc-shaped portion chamfered surface 9C is provided on a section, on the rake face 4 side, of the cutting edge of the arc-shaped portion cutting blade 6C. Note that, although the chamfered surface 9 is formed as a linear tapered surface, it may be an arc-shaped R surface, for example. Respective surface shapes of the thinning portion chamfered surface 9A, the outer peripheral portion chamfered surface 9B and the arc-shaped portion chamfered surface 9C may be the same as or different from each other.

In the drill 1 of the present embodiment having the above-described shape, it is preferable that a point angle θ (refer to FIG. 2) be set within a range of 160° to 180°. Thus, for example, in the inclined surface machining in which a hole is made in an inclined surface, it is possible to reduce the component force in the radial direction applied to the drill 1 at the time of biting. Therefore, it is possible to suppress slipping of the leading end portion and the resulting deterioration in hole position precision at the time of biting.

Further, in the drill 1, the cutting blade 6 is configured by the thinning portion cutting blade 6A, the outer peripheral portion cutting blade 6B and the arc-shaped portion cutting blade 6C, and is configured such that both sides of the arc-shaped portion cutting blade 6C are sandwiched by the thinning portion cutting blade 6A and the outer peripheral portion cutting blade 6B that have a linear shape. Thus, the thinning portion cutting blade 6A and the outer peripheral portion cutting blade 6B come into contact with the work material first, and at that time, the arc-shaped portion cutting blade 6C does not come into contact with the work material. Therefore, it is possible to reduce a load applied to the cutting blade 6 when the cutting blade 6 first bites into the work material. As a result, it is possible to improve the stability of the drill 1 when the cutting blade 6 first bites into the work material.

The thinning portion cutting blade 6A and the outer peripheral portion cutting blade 6B come into contact with and bite into the work material first, and subsequently, the arc-shaped portion cutting blade 6C comes into contact with and bites into the work material. As a result, the work material is cut, and, since a compression force toward a width direction is applied to chips generated by the arc-shaped portion cutting blades 6C, the chips are easily broken. As a result, since the chips generated during the machining can be made short, clogging, entanglement or the like is unlikely to occur in the discharge grooves 3. Thus, the drill 1 can improve a discharge performance of the chips by the discharge grooves 3.

Further, the ratio of the arc-shaped portion cutting blades 6C to the whole area of the cutting blades 6 is preferably set within the range of 50 to 70%. Note that, "the whole area of the cutting blades 6" means the length of the whole area obtained by adding the lengths of the two cutting blades 6 in the radial direction, and "the ratio of the arc-shaped portion cutting blades 6C" means the ratio of the length obtained by adding the lengths of the two arc-shaped portion cutting blades 6C in the radial direction with respect to the whole area of the cutting blades 6C. Thus, the drill 1 can effectively cause the compression force in the width direction to act on the chips generated by the arc-shaped portion cutting blades 6C. As a result, since the chips are more easily broken, the chips do not increase in length, and it is possible to further improve the discharge performance of the chips by the discharge grooves 3.

Further, since the cutting fluid is ejected from the two oil holes 12 provided in the leading end portion of the drill 1, it is possible to effectively cool the machining point of the work material by the drill 1. Thus, the drill 1 can cut the work material to a deeper depth. Further, the cutting fluid ejected onto the machining point flows along the discharge grooves 3 and discharged, together with the chips cut short during the machining. Thus, the drill 1 can further improve the discharge performance of the chips by the discharge grooves 3.

Further, the thinning portion cutting blade 6A is provided with the thinning portion chamfered surface 9A, and the outer peripheral portion cutting blade 6B is provided with the outer peripheral portion chamfered surface 9B. The thinning portion cutting blade 6A and the outer peripheral portion cutting blade 6B are sections which come into contact with the work material first, and to which the cutting load is easily applied. Therefore, since the thinning portion chamfered surface 9A and the outer peripheral portion chamfered surface 9B are provided on the thinning portion cutting blade 6A and the outer peripheral portion cutting blade 6B, it is possible to effectively inhibit the chipping of the cutting edge of each of the thinning portion cutting blade 6A and the outer peripheral portion cutting blade 6B. Further, since the arc-shaped portion cutting blade 6C is also provided with the arc-shaped portion chamfered surface 9C, it is also possible to inhibit the chipping of the cutting edge of the arc-shaped portion cutting blade 6C.

Drill axis direction widths of each of the thinning portion chamfered surface 9A and the outer peripheral portion chamfered surface 9B are the same as each other. The drill axis direction width is a distance (a length) in an axial line direction of the drill 1. When the drill axis direction width of each of the thinning portion chamfered surface 9A and the outer peripheral portion chamfered surface 9B is denoted by L1 (refer to FIG. 5) and the drill axis direction width of the arc-shaped portion chamfered surface 9C is denoted by L2, the relationship L1>L2 is established. Since L2 is smaller than L1, at the leading end portion of the drill 1, it is possible to retain sharpness while blunting and reinforcing the cutting edge of the arc-shaped portion cutting blade 6C. Thus, at the leading end portion of the drill 1, it is possible to improve the biting performance and the stability with respect to the work material. It is thus possible to reduce vibration occurring in the drill 1 at the time of machining. Since the vibration can be reduced, it is possible to inhibit positional displacement of a machined hole and to promote formation of short chips. Note that, in the present embodiment, it is sufficient that at least the relationship L1>L2 be established. However, it is preferable that L1 be within a range of 0.12 to 1.4% of the drill diameter and L2 be equal to or less than 0.008 mm. Thus, the drill 1 can further improve the biting performance and the stability with respect to the work material.

Note that the thinning portion chamfered surface 9A and the outer peripheral portion chamfered surface 9B may be formed by chamfering using a grinding stone or the like, for example. In contrast to this, the arc-shaped portion chamfered surface 9C has a smaller drill axis direction width than the thinning portion chamfered surface 9A and the outer peripheral portion chamfered surface 9B. Therefore, instead of being formed by the chamfering using the grinding stone or the like, when the arc-shaped portion chamfered surface 9C is formed by blast machining, peening machining or the like, for example, the arc-shaped portion chamfered surface 9C having a fine drill axis direction width can be formed with high precision.

Next, in order to verify the above-described numeric limitations defined for the shape of the drill 1, tests 1 to 5 were conducted. Hereinafter, an explanation will be made sequentially.

Test 1 will be explained with reference to FIG. 6 to FIG. 10. In test 1, an appropriate ratio of the arc-shaped portion cutting blades 6C to the whole area of the cutting blades 6, and an appropriate range of each of the drill axis direction widths L1 and L2 of the chamfered surface 9 were ascertained. In test 1, five test sections were set by changing the ratio of the arc-shaped portion cutting blades 6C to the whole area of the cutting blades 6, and a plurality of drills were formed by combining L1 and L2 that were changed for each of the test sections. Performance tests were conducted for these drills. The ratio of the arc-shaped portion cutting blades 6C to the whole area of the cutting blades 6 was set to 60% in test section 1-1, 50% in test section 1-2, 70% in test section 1-3, 73% in test section 1-4, and 45% in test section 1-5. The point angle θ of each of the drills was set to 180°.

In the performance tests, the performance of each of the drills was evaluated by actually machining the work material using each of the drills. An evaluation method was adopted using three evaluation items, namely, hole displacement, chip length and tool durability, which were given a three-level evaluation of "∘" (Good), "Δ" (Acceptable) and "x" (Poor). The hole displacement is a displacement amount (a distance) of the actually machined hole from an estimated position. The estimated position is an estimated position of the hole at which the work material is to be machined using the drill mounted on the main shaft of the machine tool. The position of the hole is a center position of the hole. The chip length is a length of the chips generated during the machining of the work material. The tool durability was evaluated by the number of holes that could be continuously machined using the drill.

Test Section 1-1

The ratio of the arc-shaped portion cutting blades 6C is 60%. Machining conditions of the work material are as follows: drill diameter=φ3, radial direction width of the arc-shaped portion cutting blade 6C=1.8 mm, work material=SUS304, machined surface=30° inclined surface, circumferential velocity=50 m/min, feed amount=0.023 mm/rev, and hole depth=9 mm. With respect to L1, five types, i.e., 0.0000 mm, 0.0036 mm, 0.0219 mm, 0.0420 mm, and 0.0600 mm, were set. With respect to L2, four types, i.e., 0.000 mm, 0.005 mm, 0.008 mm, and 0.010 mm, were set. Then, 20 drills were formed by mutually combining these values of L1 and L2, and the performance test was conducted for each of the drills.

Results of the performance tests in test section 1-1 will be explained with reference to FIG. 6. In test section 1-1, when the hole displacement was within 0.06 mm, an average chip length was less than 15 mm, and the tool durability was equal to or more than 150 holes, the drill was evaluated as being "∘". When the tool durability was less than 150 holes, the drill was evaluated as being "Δ." When the hole displacement exceeded 0.06 mm and the chips were elongated such that the average chip length exceeded 15 mm, the drill was evaluated as being "x." As shown in FIG. 6, in test section 1-1, the drills for which L1 was within a range of 0.0036 mm to 0.0420 mm and L2 was within a range of 0.000 mm to 0.008 mm were all evaluated as being "∘." The drills for which L1 was 0.0000 mm were all evaluated as being "Δ." The drills for which L1 was 0.0600 mm were all evaluated as being "x." The drills for which L1 was 0.036 mm to 0.0420 mm and L2 was 0.010 mm were all evaluated as being "x."

From the above results, the appropriate range of L1 in test section 1-1 was 0.0036 mm to 0.0420 mm, and the appropriate range of L2 was less than 0.008 mm. When the above-described appropriate range of L1 was converted to a ratio with respect to the drill diameter, the appropriate range was 0.12% to 1.4%. Therefore, in the drills for which the ratio of the arc-shaped portion cutting blades 6C to the whole area of the cutting blades 6 is 60%, it was verified that the appropriate range of L1 is 0.12% to 1.4% of the drill diameter and the appropriate range of L2 is less than 0.008 mm.

Test Section 1-2

The ratio of the arc-shaped portion cutting blades 6C is 50%. The machining conditions of the work material are as follows: drill diameter=φ6, radial direction width of the arc-shaped portion cutting blade 6C=3 mm, work material=SUS304, machined surface=30° inclined surface, circumferential velocity=50 m/min, feed amount=0.045 mm/rev, and hole depth=18 mm. With respect to L1, five types, i.e., 0.0000 mm, 0.0072 mm, 0.0438 mm, 0.0840 mm, and 0.1200 mm, were set. With respect to L2, four types, i.e., 0.000 mm, 0.005 mm, 0.008 mm, and 0.010 mm, were set. Then, 20 drills were formed by mutually combining these values of L1 and L2, and the performance test was conducted for each of the drills.

Results of the performance tests in test section 1-2 will be explained with reference to FIG. 7. In test section 1-2, when the hole displacement was within 0.12 mm, the average chip length was less than 15 mm, and the tool durability was equal to or more than 150 holes, the drill was evaluated as being "∘." When the tool durability was less than 150 holes, the drill was evaluated as being "Δ." When the hole displacement exceeded 0.12 mm and the chips were elongated such that the average chip length exceeded 15 mm, the drill was evaluated as being "x." As shown in FIG. 7, in test section 1-2, the drills for which L1 was within a range of 0.0072 mm to 0.0840 mm and L2 was within the range of 0.000 mm to 0.008 mm were all evaluated as being "∘." The drills for which L1 was 0.0000 mm were all evaluated as being "Δ." The drills for which L1 was 0.1200 mm were all evaluated as being "x." The drills for which L1 was 0.072 mm to 0.0840 mm and L2 was 0.010 mm were all evaluated as being "x."

From the above results, the appropriate range of L1 in test section 1-2 was 0.0072 mm to 0.0840 mm, and the appropriate range of L2 was less than 0.008 mm. When the above-described appropriate range of L1 was converted to the ratio with respect to the drill diameter, the appropriate range was 0.12% to 1.4%. Therefore, also in the drills for which the ratio of the arc-shaped portion cutting blades 6C to the whole area of the cutting blades 6 is 50%, it was verified that the appropriate range of L1 is 0.12% to 1.4% of the drill diameter and the appropriate range of L2 is less than 0.008 mm.

Test Section 1-3

The ratio of the arc-shaped portion cutting blades 6C is 70%. The machining conditions of the work material are as follows: drill diameter=φ10, radial direction width of the arc-shaped portion cutting blade 6C=7 mm, work material=SUS304, machined surface=30° inclined surface, circumferential velocity=50 m/min, feed amount=0.075 mm/rev, and hole depth=30 mm. With respect to L1, five types, i.e., 0.0000 mm, 0.0120 mm, 0.0730 mm, 0.1400 mm, and 0.2000 mm, were set. With respect to L2, four types, i.e., 0.000 mm, 0.005 mm, 0.008 mm, and 0.010 mm, were set. Then, 20 drills were formed by mutually combining these values of L1 and L2, and the performance test was conducted for each of the drills.

Results of the performance tests in test section 1-3 will be explained with reference to FIG. 8. In test section 1-3, when the hole displacement was within 0.20 mm, the average chip length was less than 15 mm, and the tool durability was equal to or more than 150 holes, the drill was evaluated as being "○." When the tool durability was less than 150 holes, the drill was evaluated as being "φ." When the hole displacement exceeded 0.20 mm and the chips were elongated such that the average chip length exceeded 15 mm, the drill was evaluated as being "x." As shown in FIG. 8, in test section 1-3, the drills for which L1 was within a range of 0.0120 mm to 0.1400 mm and L2 was within the range of 0.000 mm to 0.008 mm were all evaluated as being "○." The drills for which L1 was 0.0000 mm were all evaluated as being "Δ." The drills for which L1 was 0.2000 mm were all evaluated as being "x." The drills for which L1 was 0.0120 mm to 0.1400 mm and L2 was 0.010 mm were all evaluated as being "x."

From the above results, the appropriate range of L1 in test section 1-3 was 0.0120 mm to 0.1400 mm, and the appropriate range of L2 was less than 0.008 mm. When the above-described appropriate range of L1 was converted to the ratio with respect to the drill diameter, the appropriate range was 0.12% to 1.4%. Therefore, also in the drills for which the ratio of the arc-shaped portion cutting blades 6C to the whole area of the cutting blades 6 is 70%, it was verified that the appropriate range of L1 is 0.12% to 1.4% of the drill diameter and the appropriate range of L2 is less than 0.008 mm.

Test Section 1-4

The ratio of the arc-shaped portion cutting blades 6C is 73%. The machining conditions of the work material are as follows: drill diameter=φ16, radial direction width of the arc-shaped portion cutting blade 6C=11.7 mm, work material=SUS304, machined surface=30° inclined surface, circumferential velocity=50 m/min, feed amount=0.12 mm/rev, and hole depth=48 mm. With respect to L1, five types, i.e., 0.0000 mm, 0.0192 mm, 0.1168 mm, 0.2240 mm, and 0.3200 mm, were set. With respect to L2, four types, i.e., 0.000 mm, 0.005 mm, 0.008 mm, and 0.010 mm, were set. Then, 20 drills were formed by mutually combining these values of L1 and L2, and the performance test was conducted for each of the drills.

Results of the performance tests in test section 1-4 will be explained with reference to FIG. 9. In test section 1-4, when the hole displacement was within 0.32 mm, the average chip length was less than 15 mm, and the tool durability was equal to or more than 150 holes, the drill was evaluated as being "○." When the tool durability was less than 150 holes, the drill was evaluated as being "Δ." When the hole displacement exceeded 0.32 mm and the chips were elongated such that the average chip length exceeded 15 mm, the drill was evaluated as being "x." As shown in FIG. 9, in test section 1-4, regardless of L2, the drills for which L1 was 0.000 mm were all evaluated as being "Δ," and the drills for which L1 was within a range of 0.0192 mm to 0.3200 mm were all evaluated as being "x."

From the above results, in test section 1-4, there were no drills evaluated as being "○," and the appropriate ranges of L1 and L2 could not be obtained. Therefore, in the drills for which the ratio of the arc-shaped portion cutting blades 6C to the whole area of the cutting blades 6 is 73%, it was verified that the performance of the drills deteriorates regardless of L1 and L2.

Test Section 1-5

The ratio of the arc-shaped portion cutting blades 6C is 45%. The machining conditions of the work material are as follows: drill diameter=φ20, radial direction width of the arc-shaped portion cutting blade 6C=9 mm, work material=SUS304, machined surface=30° inclined surface, circumferential velocity=50 m/min, feed amount=0.015 mm/rev, and hole depth=60 mm. With respect to L1, five types, i.e., 0.0000 mm, 0.0240 mm, 0.1460 mm, 0.2800 mm, and 0.4000 mm, were set. With respect to L2, four types, i.e., 0.000 mm, 0.005 mm, 0.008 mm, and 0.010 mm, were set. Then, 20 drills were formed by mutually combining these values of L1 and L2, and the performance test was conducted for each of the drills.

Results of the performance tests in test section 1-5 will be explained with reference to FIG. 10. In test section 1-5, when the hole displacement was within 0.40 mm, the average chip length was less than 15 mm, and the tool durability was equal to or more than 150 holes, the drill was evaluated as being "○." When the tool durability was less than 150 holes, the drill was evaluated as being "Δ." When the hole displacement exceeded 0.40 mm and the chips were elongated such that the average chip length exceeded 15 mm, the drill was evaluated as being "x." As shown in FIG. 10, in test section 1-5, regardless of L2, the drills for which L1 was 0.000 mm were all evaluated as being "Δ," and the drills for which L1 was within a range of 0.0240 mm to 0.4000 mm were all evaluated as being "x."

From the above results, similarly to test section 1-4, also in test section 1-5, there were no drills evaluated as being "○," and the appropriate ranges of L1 and L2 could not be obtained. Therefore, also in the drills for which the ratio of the arc-shaped portion cutting blades 6C to the whole area of the cutting blades 6 is 45%, it was verified that the performance of the drills deteriorates regardless of L1 and L2.

From an integrated result of test sections 1-1 to 1-5 described above, in the drills for which the ratio of the arc-shaped portion cutting blades 6C to the whole area of the cutting blades 6 is 50% to 70%, it was verified that the appropriate range of L1 is 0.12% to 1.4% of the drill diameter and the appropriate range of L2 is less than 0.008 mm.

Test 2 will be explained with reference to FIG. 11 to FIG. 15. In test 2, an appropriate range of the point angle θ was ascertained. Similarly to test 1, also in test 2, five test sections were set by changing the ratio of the arc-shaped portion cutting blades 6C to the whole area of the cutting blades 6. Then, a plurality of drills were formed by changing the point angle θ while changing, in each test section, the combination of L1 and L2 within the appropriate ranges of L1 and L2 verified by test 1 described above. The performance tests were conducted for these drills. Similarly to test 1, the ratio of the arc-shaped portion cutting blades 6C to the whole area of the cutting blades 6 was set to 60% in test section 2-1, 50% in test section 2-2, 70% in test section 2-3, 73% in test section 2-4, and 45% in test section 2-5. Note that the evaluation method of the drills in the performance tests is the same as that used in test 1.

Test Section 2-1

The ratio of the arc-shaped portion cutting blades 6C is 60%. The machining conditions of the work material are the same as those in test section 1-1. With respect to L1, three types, i.e., 0.0036 mm, 0.0219 mm, and 0.0420 mm, were set within the appropriate range of L1 verified by test 1 described above. With respect to L2, three types, i.e., 0.000 mm, 0.0050 mm, and 0.0080 mm, were set within the appropriate range of L2 verified by test 1 described above. Further, with respect to the point angle θ, three types, i.e., 150°, 160° and 180°, were set. Then, 27 drills were formed by mutually combining these values of L1, L2 and the point angle θ, and the performance test was conducted for each of the drills.

Results of the performance tests in test section 2-1 will be explained with reference to FIG. 11. The evaluation method used in test section 2-1 is the same as the evaluation method used in test section 1-1 described above. As shown in FIG. 11, the drills for which L1 and L2 were within the appropriate ranges and the point angle θ was 160° or 180° were all evaluated as being "○." Even when L1 and L2 were within the appropriate ranges, the drills for which the point angle θ was 150° were all evaluated as being "x." From the above results, it was verified that the appropriate range of the point angle θ in test section 2-1 is 160° to 180°.

Test Section 2-2

The ratio of the arc-shaped portion cutting blades 6C is 50%. The machining conditions of the work material are the same as those in test section 1-2. With respect to L1, three types, i.e., 0.0072 mm, 0.0438 mm, and 0.0840 mm, were set within the appropriate range of L1 verified by test 1 described above. With respect to L2, three types, i.e., 0.000 mm, 0.0050 mm, and 0.0080 mm, were set within the appropriate range of L2 verified by test 1 described above. Further, with respect to the point angle θ, three types, i.e., 150°, 160° and 180°, were set. Then, 27 drills were formed by mutually combining these values of L1, L2 and the point angle θ, and the performance test was conducted for each of the drills.

Results of the performance tests in test section 2-2 will be explained with reference to FIG. 12. The evaluation method used in test section 2-2 is the same as the evaluation method used in test section 1-2 described above. As shown in FIG. 12, the drills for which L1 and L2 were within the appropriate ranges and the point angle θ was 160° or 180° were all evaluated as being "○." Even when L1 and L2 were within the appropriate ranges, the drills for which the point angle θ was 150° were all evaluated as being "x." From the above results, it was verified that the appropriate range of the point angle θ in test section 2-2 is also 160° to 180°.

Test Section 2-3

The ratio of the arc-shaped portion cutting blades 6C is 70%. The machining conditions of the work material are the same as those in test section 1-3. With respect to L1, three types, i.e., 0.0120 mm, 0.0730 mm, and 0.1400 mm, were set within the appropriate range of L1 verified by test 1 described above. With respect to L2, three types, i.e., 0.000 mm, 0.0050 mm, and 0.0080 mm, were set within the appropriate range of L2 verified by test 1 described above. Further, with respect to the point angle θ, three types, i.e., 150°, 160° and 180°, were set. Then, 27 drills were formed by mutually combining these values of L1, L2 and the point angle θ, and the performance test was conducted for each of the drills.

Results of the performance tests in test section 2-3 will be explained with reference to FIG. 13. The evaluation method used in test section 2-3 is the same as the evaluation method used in test section 1-3 described above. As shown in FIG. 13, the drills for which L1 and L2 were within the appropriate ranges and the point angle θ was 160° or 180° were all evaluated as being "○." Even when L1 and L2 were within the appropriate ranges, the drills for which the point angle θ was 150° were all evaluated as being "x." From the above results, it was verified that the appropriate range of the point angle θ in test section 2-3 is also 160° to 180°.

Test Section 2-4

The ratio of the arc-shaped portion cutting blades 6C is 73%. The machining conditions of the work material were the same as those in test section 1-4. With respect to L1, three types, i.e., 0.0192 mm, 0.1168 mm, and 0.2240 mm, were set within the appropriate range of L1 verified by test 1 described above. With respect to L2, three types, i.e., 0.000 mm, 0.0050 mm, and 0.0080 mm, were set within the appropriate range of L2 verified by test 1 described above. Further, with respect to the point angle θ, three types, i.e., 150°, 160° and 180°, were set. Then, 27 drills were formed by mutually combining these values of L1, L2 and the point angle θ, and the performance test was conducted for each of the drills.

Results of the performance tests in test section 2-4 will be explained with reference to FIG. 14. The evaluation method used in test section 2-4 is the same as the evaluation method used in test section 1-4 described above. As shown in FIG. 14, all the drills were evaluated as being "x." From the above results, in test section 2-4, there were no drills evaluated as being "○," and the appropriate range of the point angle θ could not be obtained. Therefore, in the drills for which the ratio of the arc-shaped portion cutting blades 6C to the whole area of the cutting blades 6 is 73%, it was verified that the performance of the drills deteriorates regardless of L1, L2 and the point angle θ.

Test Section 2-5

The ratio of the arc-shaped portion cutting blades 6C is 45%. The machining conditions of the work material are the same as those in test section 1-5. With respect to L1, three types, i.e., 0.0240 mm, 0.1460 mm, and 0.2800 mm, were set within the appropriate range of L1 verified by test 1 described above. With respect to L2, three types, i.e., 0.000 mm, 0.0050 mm, and 0.0080 mm, were set within the appropriate range of L2 verified by test 1 described above. Further, with respect to the point angle θ, three types, i.e., 150°, 160° and 180°, were set. Then, 27 drills were formed by mutually combining these values of L1, L2 and the point angle θ, and the performance test was conducted for each of the drills.

Results of the performance tests in test section 2-5 will be explained with reference to FIG. 15. The evaluation method used in test section 2-5 is the same as the evaluation method used in test section 1-5 described above. As shown in FIG. 15, all the drills were evaluated as being "x." From the above results, in test section 2-5, there were no drills evaluated as being "○," and the appropriate range of the point angle θ could not be obtained. Therefore, in the drills for which the ratio of the arc-shaped portion cutting blades 6C to the whole area of the cutting blades 6 is 45%, it was verified that the performance of the drills deteriorates regardless of L1, L2 and the point angle θ.

From an integrated result of test sections 2-1 to 2-5 described above, in the drills for which the ratio of the arc-shaped portion cutting blades 6C to the whole area of the cutting blades 6 is 50% to 70% and L1 and L2 are within the appropriate ranges, it was verified that the appropriate range of the point angle θ is a range from 160° to 180°.

Test 3 will be explained with reference to FIG. 16 and FIG. 17. In test 3, it was ascertained how a hole oversize is changed by defining the drill axis direction width of the arc-shaped portion chamfered surface 9C of the arc-shaped portion cutting blade 6C. The hole oversize is a distance of a difference obtained by subtracting the drill diameter from the machined hole diameter. The hole diameter is the diameter of the hole and the drill diameter is the diameter of the drill. The larger the amplitude of vibration occurring in the drill during the machining, the larger the hole oversize. The hole diameter was measured at two given points (a point a and a point b) while changing a hole phase, using a three point inside micrometer. The drill diameter was measured at each of two points (a point a and a point b) that correspond to the point a and the point b that are the measuring points of the hole diameter.

The machining conditions of the work material are as follows: work material=SUS304, machined surface=30° inclined surface, circumferential velocity V=50 (m/min), number of revolutions n=995 (/min), feed speed per revolution f=0.120 (mm/rev), and feed speed per minute Vf=119 (mm/min).

The drills used in the tests are drills T1 and T2. The drills T1 and T2 have the same configuration as the drill 1 of the present embodiment, except the chamfered surface 9. In each of the drills T1 and T2, the drill axis direction width L1 of the thinning portion chamfered surface 9A and the outer peripheral portion chamfered surface 9B is 0.117 mm, and is within the above-described appropriate range. The drill axis direction width L2 of the arc-shaped portion chamfered surface 9C of the drill T1 is 0.012 mm, and is outside the above-described appropriate range. The drill axis direction width L2 of the arc-shaped portion chamfered surface 9C of the drill T2 is 0.005 mm, and is within the above-described appropriate range. That is, the drill T1 is a comparison target product, and the drill T2 is the product of the present invention. In the test, each of the drills T1 and T2 was used to machine three holes in the work material, and the hole diameter of each of the holes was measured. Thus, the hole oversize of each of the holes with respect to the drill diameter was calculated.

Measurement results of the hole diameter will be explained. As shown in FIG. 16, among the three holes machined using the drill T1, the hole diameter of the No. 1 hole was 16.015 at the point a, and 15.998 at the point b. The hold diameter of the No. 2 hole was 15.981 at the point a, and 15.990 at the point b. The hole diameter of the No. 3 hole was 16.009 at the point a, and 15.972 at the point b. In contrast to this, among the three holes machined using the drill T2, the hole diameter of the No. 1 hole was 15.993 at the point a, and 15.992 at the point b. The hole diameter of the No. 2 hole was 15.991 at the point a, and 15.996 at the point b. The hole diameter of the No. 3 hole was 15.996 at the point a, and 15.995 at the point b.

Calculation results of the hole oversize will be explained with reference to FIG. 17. The drill diameter of the drill T1 was 15.979 at both the point a and the point b. The drill diameter of the drill T2 was 15.992 at both the point a and the point b. The hole oversize was calculated by subtracting the corresponding drill diameter from the calculation result of the hole diameter shown in FIG. 16. With respect to the three holes machined using the drill T1, the oversize of the No. 1 hole was 0.036 at the point a, and 0.019 at the point b, and an average value was 0.028. The oversize of the No. 2 hole was 0.002 at the point a, and 0.011 at the point b, and the average value was 0.007. The oversize of the No. 3 hole was 0.030 at the point a, and −0.007 at the point b, and the average value was 0.012.

On the other hand, with respect to the three holes machined using the drill T2, the oversize of the No. 1 hole was 0.001 at the point a, and 0.000 at the point b, and the average value was 0.000. The oversize of the No. 2 hole was −0.001 at the point a, and 0.004 at the point b, and the average value was 0.001. The oversize of the No. 3 hole was 0.004 at the point a, and 0.003 at the point b, and the average value was 0.003.

From the above results, it was found that the hole oversize of the hole machined using the drill T2 (the product of the present invention) is smaller than the hole oversize of the hole machined using the drill T1 (the comparison target product). It can be assumed that this is because, at the leading end portion of the drill T2, since the drill axis direction width of the arc-shaped portion chamfered surface 9C is within the appropriate range, the arc-shaped portion cutting blade 6C can favorably bite into the work material and the vibration occurring in the drill T2 can be reduced. Therefore, it could be verified that the hole oversize can be reduced by causing the drill axis direction width of the arc-shaped portion chamfered surface 9C to be within the above-described appropriate range.

Test 4 will be explained with reference to FIG. 18. In test 4, it was ascertained how a hole position displacement amount changes between the drill T1 and the drill T2. The hole position displacement amount is a displacement amount of the actually machined hole position from a target hole position. The hole position is a coordinate position of the center position of the hole in an X-Y axis plane. In test 4, the displacement amount in an X axis direction and the displacement amount in a Y axis direction were measured, and a displacement amount obtained by composing their vectors was taken as the hole position displacement amount.

The machining conditions of the work material are as follows: drill diameter=ϕ16, radial direction width of the arc-shaped portion cutting blade 6C=10.4 mm, work material=SUS304, machined surface=30° inclined surface, circumferential velocity=50 m/min, feed amount=0.012 mm/rev, number of revolutions n=995 (/min), feed speed per minute Vf=119 (mm/min), and hole depth=48 mm. The two types of drills, i.e., the drill T1 and the drill T2 used in test 3 were prepared as the drills to be used in the test. In the present test, each of the two types of drills was used to machine three holes in the work material, and the hole position displacement amount of each of the holes was measured.

Measurement results of the hole position displacement amount will be explained. As shown in FIG. 18, with respect to the three holes machined using the drill T1, the displacement amount of the No. 1 hole in the X axis direction was −0.029 mm, and the displacement amount in the Y axis direction was 0.129 mm. Therefore, the hole position displacement amount was 0.132 mm. The displacement amount of the No. 2 hole in the X axis direction was −0.027 mm, and the displacement amount in the Y axis direction was 0.134 mm. Therefore, the hole position displacement amount was 0.137 mm. The displacement amount of the No. 3 hole in the X axis direction was −0.027 mm, and the displacement amount in the Y axis direction was 0.124 mm. Therefore, the hole position displacement amount was 0.127 mm.

On the other hand, with respect to the three holes machined using the drill T2, the displacement amount of the No. 1 hole in the X axis direction was −0.023 mm, and the displacement amount in the Y axis direction was 0.122 mm. Therefore, the hole position displacement amount was 0.124 mm. The displacement amount of the No. 2 hole in the X axis direction was −0.032 mm, and the displacement amount in the Y axis direction was 0.119 mm. Therefore, the hole position displacement amount was 0.123 mm. The displacement amount of the No. 3 hole in the X axis direction was −0.009 mm, and the displacement amount in the Y axis direction was 0.117 mm. Therefore, the hole position displacement amount was 0.117 mm.

From the above results, it was found that, when the drill T2 (the product of the present invention) is used for the machining, the hole position displacement amount is smaller than that when the drill T1 (the comparison target product) is used for the machining. It can be assumed that this is because, at the leading end portion of the drill T2, since the drill axis direction width of the arc-shaped portion chamfered surface 9C is within the appropriate range, the arc-shaped portion cutting blade 6C can favorably bite into the work material and the vibration occurring in the drill T2 can be reduced. Therefore, it could be verified that the hole position displacement amount can be reduced by causing the drill axis direction width of the arc-shaped portion chamfered surface 9C to be within the above-described appropriate range.

Figure 19:
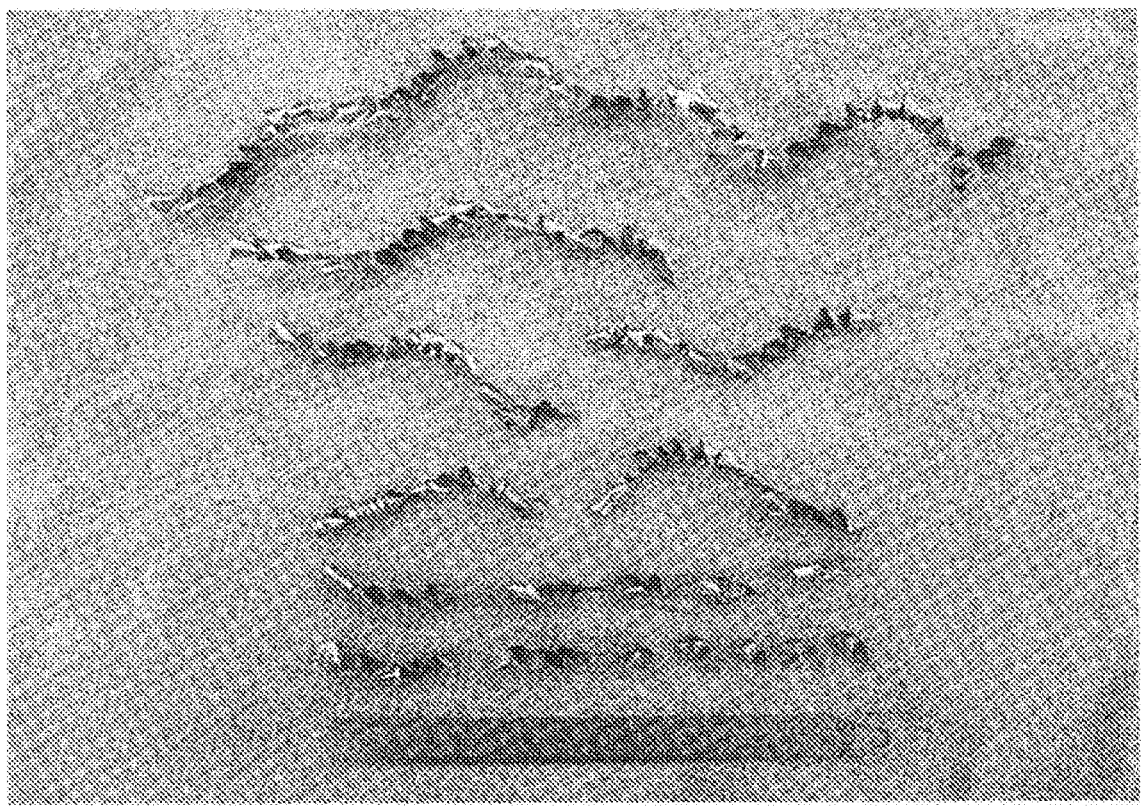
FIG. 19 is a photograph of chips when a work material is machined using a drill T1 in test 5.
Figure 20:
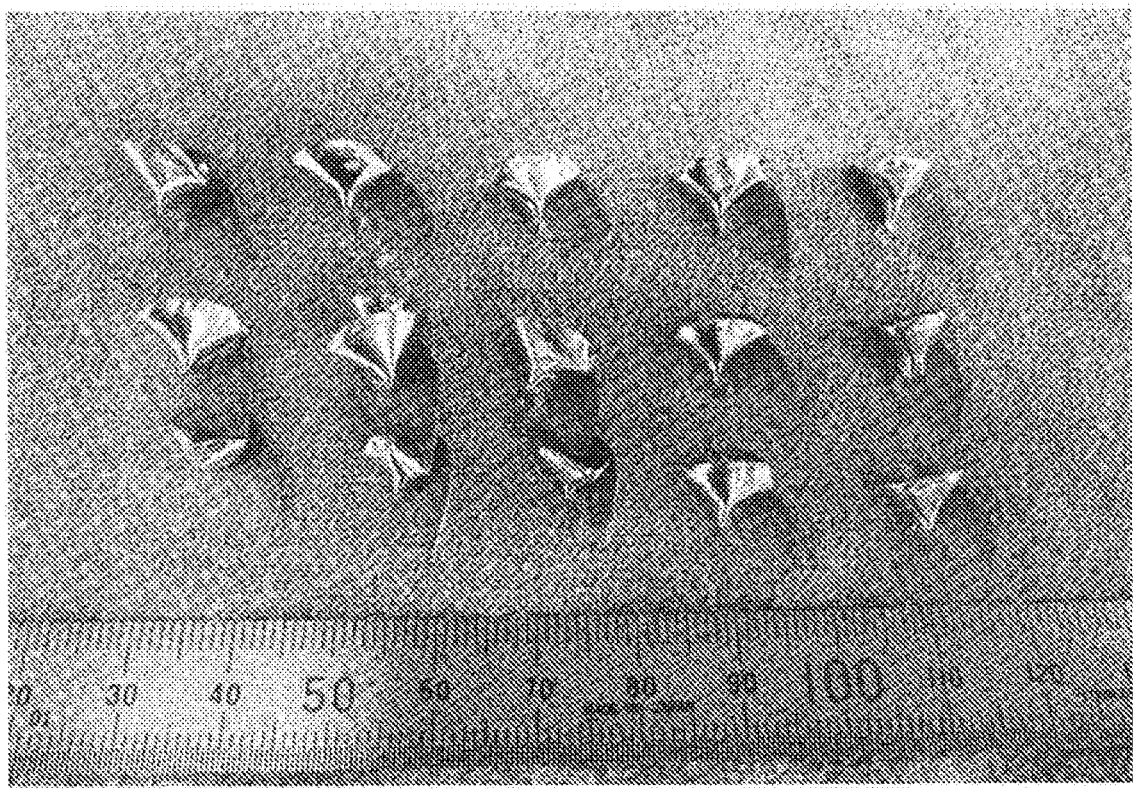
FIG. 20 is a photograph of chips when the work material is machined using a drill T2 in test 5.

Test 5 will be explained with reference to FIG. 19 and FIG. 20. In test 5, it was ascertained how the shape of the chips generated during the machining changes between the drill T1 and the drill T2. The machining conditions of the work material are as follows: drill diameter=ϕ16, radial direction width of the arc-shaped portion cutting blade 6C=10.4 mm, work material=SUS304, machined surface=30° inclined surface, circumferential velocity=50 m/min, feed amount=0.012 mm/rev, number of revolutions n=995 (/min), feed speed per minute Vf=119 (mm/min), and hole depth=48 mm. The two types of drills, i.e., the drill T1 and the drill T2 used in tests 3 and 4 were prepared as the drills to be used in the test. In the present test, each of the two types of drills was used to machine holes in the work material, and the shape of the chips generated during the machining was checked.

The shape of the chips will be explained. As shown in FIG. 19, with respect to the chips generated by the machining using the drill T1 (the comparison target product), long chips and short chips are mixed and some of the long chips are elongated to 20 cm or more. In contrast to this, as shown in FIG. 20, all the chips generated by the machining using the drill T2 (the product of the present invention) are short, and the average length is about 15 mm. From the above results, it was found that, when the drill T2 is used for the machining, the shape of the chips generated during the machining is shorter than that when the drill T1 is used for the machining. It can be assumed that this is because, at the leading end portion of the drill T2, since the drill axis direction width of the arc-shaped portion chamfered surface 9C is within the appropriate range, the arc-shaped portion cutting blade 6C can favorably bite into the work material and the chips are easily broken along the arc-shaped portion cutting blade 6C. Therefore, it could be verified that the shape of the chips can be shortened by causing the drill axis direction width of the arc-shaped portion chamfered surface 9C to be within the above-described appropriate range.

In the above-described explanation, the thinning portion cutting blade 6A is an example of an "inside linear portion" of the present invention. The outer peripheral portion cutting blade 6B is an example of an "outside linear portion" of the present invention. The arc-shaped portion cutting blade 6C is an example of an "arc-shaped portion" of the present invention. The thinning portion chamfered surface 9A and the outer peripheral portion chamfered surface 9B are an example of a "linear portion chamfered surface" of the present invention. The main body portion 2 of the drill 1 is an example of a "drill main body portion" of the present invention. The discharge groove 3 is an example of a "chip discharge groove" of the present invention.

As explained above, the leading end portion of the drill 1 of the present embodiment is flat, and is provided with the two cutting blades 6 that extend from the rotation center toward the outside in the radial direction. Each of the cutting blades 6 is provided with the arc-shaped portion cutting blade 6C, the thinning portion cutting blade 6A, and the outer peripheral portion cutting blade 6B. The arc-shaped portion cutting blade 6C is formed in the arc shape. The thinning portion cutting blade 6A connects to one end of the arc-shaped portion cutting blade 6C on the rotation center side, and is formed in the linear shape. The outer peripheral portion cutting blade 6B connects to the other end of the arc-shaped portion cutting blade 6C on the opposite side to the one end, and is formed in the linear shape. The cutting edge of the arc-shaped portion cutting blade 6C is provided with the arc-shaped portion chamfered surface 9C that is chamfered. The cutting edge of the thinning portion cutting blade 6A is provided with the thinning portion chamfered surface 9A that is chamfered, and the cutting edge of the outer peripheral portion cutting blade 6B is provided with the outer peripheral portion chamfered surface 9B that is chamfered. The drill axis direction width L2 of the arc-shaped portion chamfered surface 9C is smaller than the drill axis direction width L1 of each of the thinning portion chamfered surface 9A and the outer peripheral portion chamfered surface 9B. Thus, at the leading end portion of the drill 1, it is possible to retain the sharpness at the cutting edge of the arc-shaped portion cutting blade 6C while blunting and reinforcing the cutting edge of the thinning portion cutting blade 6A and the outer peripheral portion cutting blade 6B. Thus, at the leading end portion of the drill 1, it is possible to improve the biting performance and the stability with respect to the work material. It is thus possible to reduce vibration occurring in the drill 1 at the time of machining. Since the vibration can be reduced, it is possible to inhibit the positional displacement of the machined hole and to promote the formation of short chips.

Figure 21:
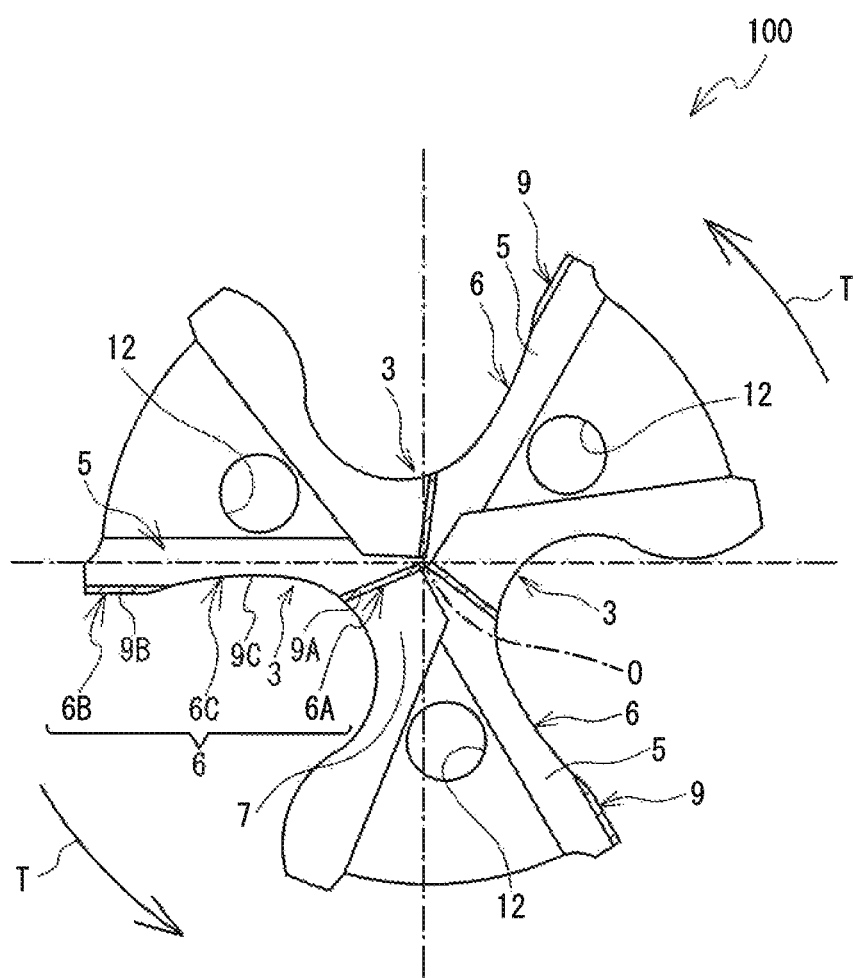
FIG. 21 is a side view of a drill 100 (having three blades).

Note that the present invention is not limited to the above-described embodiment, and various changes are possible. Although the drill 1 of the above-described embodiment is a two-blade drill, the number of the blades is not limited to this example, and may be more than two. For example, a drill 100 shown in FIG. 21 is a three-blade drill. Note that, in FIG. 21, portions that are the same as the configuration of the leading end portion of the drill 1 of the above-described embodiment are denoted with the same reference numerals and an explanation thereof will be made. The drill 100 is provided with three of the cutting blades 6 at the leading end portion of the main body portion 2. The three cutting blades 6 are respectively disposed at 120° intervals around the axis line O of the drill 100. The cutting blades 6 are provided with the configuration of the cutting blades 6 of the two-blade drill 1 of the above-described embodiment. Therefore, also with the three-blade drill 100, similar effects to those of the above-described embodiment can be obtained.

Figure 22:
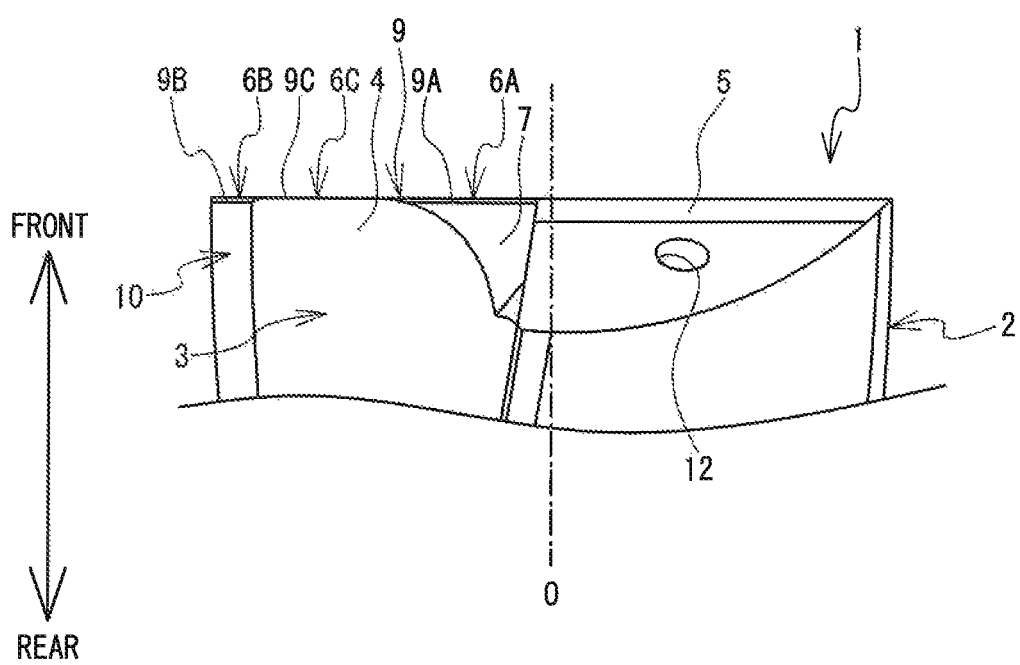
FIG. 22 is a side view of a modified part of the drill 1.

The drill 1 of the above-described embodiment may be provided with a chamfered portion 10 along the outer peripheral end side of the rake face 4 of the discharge groove 3, as shown in FIG. 22, for example. When the drill 1 is provided with the chamfered portion 10, it is possible to inhibit chipping that occurs in the rake face 4 and at a corner portion of the outer peripheral end, particularly when the inclined surface machining is performed.

In the drill 1 of the above-described embodiment, the drill axis direction width of the thinning portion chamfered surface 9A and the drill axis direction width of the outer peripheral portion chamfered surface 9B are the same as each other. However, as long as they are within the range of 0.12 to 1.4% of the drill diameter, they may be different from each other. Although the thinning portion chamfered surface 9A and the outer peripheral portion chamfered surface 9B are both chamfered using a grinding stone or the like, they may be formed by another chamfering process. Mutually different machining methods may be used for the thinning portion chamfered surface 9A and the outer peripheral portion chamfered surface 9B.

Although the two oil holes 12 are provided in the leading end portion of the drill 1 of the above-described embodiment, one or more than 2 oil holes may be provided. Further, the oil holes 12 may be omitted. The shape of the oil hole 12 need not necessarily be circular.

Although the two discharge grooves 3 are formed in the outer peripheral surface of the drill 1 of the above-described embodiment, there may be one or three or more of the discharge grooves 3.

The invention claimed is:

1. A drill whose a point angle of a leading end portion is within a range of 160 degrees to 180 degrees and the leading end portion has at least two cutting blades extending from a rotation center toward outside in a radial direction, each of the cutting blades including an arc-shaped portion formed in an arc shape, an inside linear portion formed in a linear shape and connecting to one end of the arc-shaped portion on the rotation center side, and an outside linear portion formed in a linear shape and connecting to another end of the arc-shaped portion on an opposite side to the one end, the arc-shaped portion having a cutting edge provided with an arc-shaped portion chamfered surface that is chamfered, and the inside linear portion and the outside linear portion each having a cutting edge provided with a linear portion chamfered surface that is chamfered, the drill further comprising:

a drill main body portion being in a columnar shape of which an axis coincides with the rotation center, having the leading end portion wherein a direction along which the axis extends is defined as an axis line direction; and a chip discharge groove formed in a spiral shape along the axis line direction of the drill main body portion, in an outer peripheral surface of the drill main body portion, from the cutting blade to a rear end side of the drill main body portion, wherein the linear portion chamfered surface is configured with
  an inside linear portion chamfered surface that is disposed at the cutting blade of the inside linear portion and
  an outside linear portion chamfered surface that is disposed at the cutting blade of the outside linear portion, a drill axis direction width of the arc-shaped portion chamfered surface is smaller than both of drill axis direction widths of the inside linear portion chamfered surface and the outside linear portion chamfered surface wherein the drill axis direction widths are measured in the drill axis direction, and the drill axis direction widths of the inside linear portion chamfered surface and the outside linear portion chamfered surface are the same.

2. The drill according to claim 1, wherein
the drill axis direction widths of the inside linear portion chamfered surface and the outside linear portion chamfered surface are within a range of 0.12 to 1.4 percent of a drill diameter, and
the drill axis direction width of the arc-shaped portion chamfered surface is equal to or less than 0.008 mm.

3. The drill according to claim 1, wherein
a length of the arc-shaped portion in the radial direction is within a range of 50 to 70 percent of a length of the whole cutting blade in the radial direction.

4. The drill according to claim 1, further comprising:
a supply path to which a cutting oil is supplied and which extends inside the drill main body portion from the rear end side toward the leading end portion; and
an oil hole provided in the leading end portion and communicated with the supply path, the oil hole being configured to eject the cutting oil that has flowed through the supply path.

5. The drill according to claim 1, wherein
from a viewpoint of the drill axis direction, the inside linear portion chamfered surface is aligned with the outside linear portion chamfered surface in the radial direction, and
the arc-shaped portion chamfered surface is sandwiched between the inside linear portion chamfered surface and the outside linear portion chamfered surface in the radial direction.

6. The drill according to claim 1, wherein
the inside linear portion chamfered surface and the outside linear portion chamfered surface are both flat.

* * * * *